(12) United States Patent
Jing

(10) Patent No.: US 6,767,948 B1
(45) Date of Patent: Jul. 27, 2004

(54) POLYOLEFIN POLYMER AND CATALYST BLEND FOR BONDING FLUOROPOLYMERS

(75) Inventor: Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/470,155

(22) Filed: Dec. 22, 1999

(51) Int. Cl.[7] .......................... B32B 27/04; B32B 27/18; B32B 27/32; B32B 27/34; B32B 27/40
(52) U.S. Cl. .................. 524/367; 524/107; 524/108; 524/186; 524/262; 524/366; 524/378; 524/430; 524/394; 428/421; 428/423.1; 428/474.4; 428/500; 428/355 EN; 428/355 AC; 428/355 N
(58) Field of Search ................................ 428/480, 500; 524/174, 394, 186, 107, 108, 366, 378

(56) References Cited

U.S. PATENT DOCUMENTS

| | | |
|---|---|---|
| 3,190,178 A | 6/1965 | McKenzie |
| 4,197,380 A | 4/1980 | Chao et al. |
| 4,208,488 A * | 6/1980 | Kraft et al. ................. 525/107 |
| 4,233,421 A | 11/1980 | Worm |
| 4,335,238 A | 6/1982 | Moore et al. |
| 4,542,192 A * | 9/1985 | Kraft et al. ................. 525/438 |
| 4,549,921 A | 10/1985 | Wolfe, Jr. |
| 4,558,142 A | 12/1985 | Holland et al. |
| 4,600,651 A | 7/1986 | Aufdermarsh et al. |
| 4,677,017 A | 6/1987 | DeAntonis et al. |
| 4,740,562 A | 4/1988 | Menke et al. |
| 4,886,689 A | 12/1989 | Kotliar et al. |
| 4,912,171 A | 3/1990 | Grootaert et al. |
| 4,980,086 A | 12/1990 | Hiraiwa et al. |
| 5,069,964 A | 12/1991 | Tolliver et al. |
| 5,086,123 A | 2/1992 | Guenthner et al. |
| 5,096,782 A | 3/1992 | Dehennau et al. |
| 5,143,761 A | 9/1992 | Chiotis et al. |
| 5,169,979 A * | 12/1992 | Kubillus et al. ............ 560/176 |
| 5,227,426 A * | 7/1993 | Tse et al. .................... 524/534 |
| 5,262,490 A | 11/1993 | Kolb et al. |
| 5,320,888 A | 6/1994 | Stevens |
| 5,419,374 A | 5/1995 | Nawrot et al. |
| 5,427,831 A | 6/1995 | Stevens |
| 5,441,782 A | 8/1995 | Kawashima et al. |
| 5,500,263 A | 3/1996 | Rober et al. |
| 5,591,804 A | 1/1997 | Coggio et al. |
| 5,656,121 A | 8/1997 | Fukushi |
| 5,658,670 A | 8/1997 | Fukushi et al. |
| 5,736,610 A | 4/1998 | Nishi et al. |
| 5,827,587 A | 10/1998 | Fukushi |
| 5,891,538 A | 4/1999 | Yamamoto et al. |
| 5,939,492 A | 8/1999 | Lorek |
| 5,965,275 A | 10/1999 | Nishi et al. |

FOREIGN PATENT DOCUMENTS

| | | |
|---|---|---|
| AU | B-12462/95 | 3/1999 |
| CA | 2156659 A1 | 5/1996 |
| EP | 0 523 644 A1 | 1/1993 |
| EP | 0 642 921 A1 | 3/1995 |
| WO | WO 95/11464 | 4/1995 |
| WO | WO 95/11943 | 5/1995 |
| WO | WO 96/05965 A1 | 2/1996 |
| WO | WO 96/16801 | 6/1996 |
| WO | WO 99/00455 | 1/1999 |
| WO | WO 99/00460 | 1/1999 |
| WO | WO 99/52974 | 10/1999 |
| WO | WO 99/52975 | 10/1999 |

OTHER PUBLICATIONS

"Catalysis, Phase–Transfer", Kirk–Othmer Encyclopedia of Chemical Technology, 4th Ed., vol. 5, pp. 374–381.

* cited by examiner

Primary Examiner—Vivian Chen
(74) Attorney, Agent, or Firm—Scott A. Bardell

(57) ABSTRACT

The invention relates to compositions useful for bonding fluoropolymer to substantially non-fluorinated polymer. The compositions of the invention comprise a substantially non-fluorinated polymer or a mixture of said polymers, a base, and a crown ether catalyst. Another aspect of the invention is an article comprising the above composition adhered to a fluoropolymer and methods of making said article.

10 Claims, No Drawings

POLYOLEFIN POLYMER AND CATALYST BLEND FOR BONDING FLUOROPOLYMERS

FIELD OF THE INVENTION

The invention relates to bonding fluoropolymers to substantially non-fluorinated polymers and particularly to a polyolefin-catalyst mixture useful for bonding fluoropolymers to substantially non-fluorinated polymers.

BACKGROUND OF THE INVENTION

Fluorine-containing polymers (i.e., fluoropolymers or fluorinated polymers) are a commercially important class of materials. Many fluoropolymers are known to exhibit high thermal stability and usefulness at high temperatures as well as extreme toughness and flexibility at very low temperatures. Many fluoropolymers are also almost totally insoluble in a wide variety of organic solvents and resistant to many chemical compounds that might degrade other classes of less resistant materials. Additionally, many fluoropolymers are recognized for their barrier properties; i.e., their ability to prevent the passage of liquids or vapors.

Increased concerns with evaporative fuel standards have led to a need for fuel system components that have improved barrier properties to minimize the permeation of fuel vapors through automotive components such as fuel filler lines, fuel supply lines, fuel tanks, and other components of automobile emission control systems. Multi-layer articles such as multi-layer tubing have been used within these applications. These multi-layer products can comprise a fluoropolymer, which provides an inert vapor barrier, and one or more other layers that can add strength, rigidity, or other mechanical properties to the multi-layer article. As an example, some multi-layer articles include a fluoropolymer and a layer comprising a substantially non-fluorinated polymer.

To be most useful, these multi-layer articles should not delaminate during use. That is, the adhesive bond strength between the different layers of the multi-layer article should be sufficiently strong and stable so as to prevent the different layers from separating on exposure to, for example, fuel, emission fluids, caustic or acidic solutions, or other aggressive chemicals. However, poor adhesion between two very dissimilar materials, fluoropolymer and hydrocarbon polymer, makes the formation of these desired constructions difficult.

A variety of methods have been employed to bond polymeric materials comprising a fluoropolymer to substantially non-fluorinated polymeric materials. For example, the layers can be adhesively bonded together by a layer of adhesive material between the two layers. Alternatively, surface treatment of one or both of the layers, used independently or in conjunction with adhesive materials, has been used to bond the two types of materials together. For example, layers comprising a fluoropolymer have been treated with a charged gaseous atmosphere followed by lamination with a layer of thermoplastic polyamide. As another approach, "tie-layers" have been used to bond a fluoropolymer material to a layer of material comprising a substantially non-fluorinated polymer. The tie layer was a layer comprising a blend of dissimilar materials disposed between the fluoropolymer and substantially non-fluoropolymer layers. Some of the disadvantages of known tie layer materials include loss of desirable physical properties of the base polymer of the tie layer, the additional manufacturing steps necessitated by the use of a "tie layer," and other problems associated with handling some of the ingredients used in the tie layers.

SUMMARY OF THE INVENTION

In one aspect, the invention provides a composition comprising a mixture of a melt-processable, substantially non-fluorinated polymer and a catalyst system comprising a base and a crown ether.

In another aspect, the invention provides an article comprising:

a) a first layer comprising fluoropolymer; and b) a second layer bonded to the first layer, the second layer comprising a mixture of a melt processable, substantially non-fluorinated polymer, a base, and a crown ether.

In another aspect, the invention provides a method of bonding fluoropolymer to a substantially non-fluorinated polymer comprising the steps of:

a) providing a bonding composition comprising a mixture of a melt processable, substantially non-fluorinated polymer, a base, and a crown ether;

b) providing fluoropolymer;

c) applying the bonding composition to a surface of the fluoropolymer; and d) forming a multi-layer article by laminating a layer of material comprising the substantially non-fluorinated polymer with a layer of material comprising the fluoropolymer with the bonding composition interposed between and in intimate contact with the two layers of materials.

The compositions of the invention are useful for promoting the adhesion of fluoropolymers to hydrocarbon polymers such as functional polyolefins, polyamides, polyimides, polyesters, polyurethanes, and hyperbranched species of the above mentioned polymers, to produce articles that are moisture, solvent, and corrosion resistant and more economical to manufacture than articles made solely of fluoropolymers.

A "functionalized polyolefin" is a polyolefin which has one or more functional groups, for example, imide, amide, oxycarbonyl, anhydride, acetate, carbonyl, hydroxide, and like groups, pendant from or integral with the polyolefin polymer backbone.

DETAILED DESCRIPTION OF THE PREFERRED EMBODIMENTS

The compositions of the invention are useful for promoting the adhesion of fluoropolymers to hydrocarbon polymers such as polyethylene, copolymers comprising ethylene monomer, polyamides, polyurethanes, and other functionalized polyolefins. Although not wishing to be bound by theory, applicants believe that the combination of a base and a crown ether promote adhesion through dehydrofluorination of the fluoropolymer and activates the pendant functional groups of the non-fluorinated polymer to chemically interact with the fluoropolymer.

The compositions of the invention contain one or more substantially non-fluorinated polyolefin. Useful substantially non-fluorinated polymeric materials can comprise any of a number of well known hydrocarbon-based polymers and copolymers or mixtures thereof. These polymeric materials also include substantially non-fluorinated polymeric materials considered to be pressure sensitive adhesives. As used herein, the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms. Preferred substantially non-fluorinated polymers include thermoplastic polyamides, polyurethanes, functionalized polyolefins, and copolymers or blends of polyolefins.

Any melt-processable, carboxyl, carboxylate, carbonyl, anhydride, amide, imide, hydroxyl, or oxycarbonyl functional polyolefin may be used to make the substantially non-fluorinated polymeric material of the invention. These functional polymers can be prepared by copolymerization of functional monomers with α-olefin monomers (e.g., ethylene, propylene, butylene, acrylate, vinyl ether, etc.), or, alternatively polyolefin polymers may be modified, or functionalized, after polymerization by, for example, grafting, or oxidation. Representative of such substantially non-fluorinated polymer useful in the present invention include, but are not limited to anhydride modified polyethylenes, commercially available from the E.I. Du Pont de Nemours and Company, Wilmington, Del., under the trade designation "BYNEL," oxycarboxy functional polyethylenes, available under the tradename "ELVAX," also available from E.I. Du Pont de Nemours and Company; ethylene/acrylic acid copolymers, commercially available from Dow Chemical Company, Midland, Mich., under the tradename "Primacor;" and ethylene/methyl acrylate copolymers, commercially available from Chevron Chemical Co., Houston, Tex., under the trade designation "EMAC."

Preferred functionalized polyolefins include ethylene/ vinyl acetate copolymers, ethylene/acrylic acid copolymers, ethylene/methyl acrylate copolymers, and ethylene/vinyl acetate copolymers.

Blends of the carboxyl, carboxylate, anhydride, amide, imide, hydroxyl, or oxycarbonyl functional polyolefins may also be used in the compositions of the present invention.

Polyamides useful as the substantially non-fluorinated polymer include nylons that are generally commercially available from a number of sources. Particularly preferred polyamides include, but are not limited to, nylon 6, nylon 6,6, nylon 11, and nylon 12. It should be noted that the selection of a particular polyamide material should be based upon the physical requirements of the particular application for the resulting article. For example, nylon 6 and nylon 6,6 offer higher heat resistant properties than nylon 11 or nylon 12; whereas nylon 11 and nylon 12 offer better chemical resistant properties. Other nylons useful in the present invention include nylon 6,12, nylon 6,9, nylon 4, nylon 4,2, nylon 4,6, nylon 7, and nylon 8. Ring containing polyamides, for example, nylon 6, T and nylon 6,T may also be used. Polyether containing polyamides, such as PEBAX™, may also be used.

Polyurethane polymers useful as the substantially non-fluorinated polymer include aliphatic, cycloaliphatic, aromatic, and polycyclic polyurethanes. These polyurethanes are typically produced by reaction of a polyfunctional isocyanate with a polyol according to well known procedures. Useful diisocyanates employed in the production of suitable polyurethanes include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetrarmethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available polyurethanes useful in the present invention include PN-04 or 3429, available from Morton International, Inc., Seabrook, N.H., and X-4107, available from B.F. Goodrich Company, Cleveland, Ohio.

The compositions of the invention include one or more inorganic or organic bases. Useful inorganic bases include metal hydroxides such as, but not limited to, lithium hydroxide, potassium hydroxide, and sodium hydroxide, metal alkoxides such as, but not limited to, potassium methoxide, potassium ethoxide, sodium methoxide, sodium ethoxide, potassium phenoxide, sodium phenoxide, metal amines such as, but not limited to, sodium ethyl amine and the like, and metal acetamides such as, but not limited to, sodium acetamide. Examples of useful organic bases include potassium phthalimide, sodium trimethylsilanoate.

The compositions of the invention contain one or more crown ethers that function as a phase transfer catalyst. Crown ethers are macrocyclic polyethers comprising dimethylene oxide units which can coordinate to a centrally located metal atom via the oxygen atoms of the ethers, thereby functioning as electron donors to the metal atom. This class of compounds is known to have strong complexing or chelating capabilities and, depending on the number of dimethylene oxide groups, can be very metal ion specific relative to its complexing or chelating capabilities. Crown ethers useful in the present invention that exhibit good chelating capabilities for sodium, calcium and potassium cations, include, but are not limited to, 18-crown-6 ether and 15-crown-5 ether. The nitrogen substituted equivalents of the crown ethers or mixed, nitrogen and oxygen substituted crown ether equivalents are also suitable for use in the preparation of the bonding compositions and laminates of the present invention.

Fluoropolymer materials useful in the present invention include those fluoropolymers broadly categorized structurally into three basic classes. The first class includes those fluorinated polymers, copolymers, terpolymers, etc., comprising interpolymerized units derived from vinylidene fluoride or vinyl fluoride (sometimes referred to as "$VF_2$" or "VDF" and "VF", respectively). Preferably, fluoropolymer materials of this first class comprise at least 3 percent by weight of interpolymerized units derived from $VF_2$ or VF. Such polymers may be homopolymers of $VF_2$ or VF or copolymers of $VF_2$ or VF and other ethylenically unsaturated monomers. Copolymers of $VF_2$ or VF and other ethylenically unsaturated monomers are examples of fluoropolymers.

$VF_2$ and VF -containing polymers and copolymers can be made by well-known conventional means, for example, by free-radical polymerization of $VF_2$ with or without other ethylenically-unsaturated monomers. The preparation of colloidal aqueous dispersions of such polymers and copolymers is described, for example, in U.S. Pat. No. 4,335,238 (Moore et al.). This reference describes a process for copolymerizing fluorinated olefins in colloidal aqueous dispersions which is carried out in the presence of water-soluble initiators that produce free radicals, such as, for example, ammonium or alkali metal persulfates or alkali metal permanganates, and in the presence of emulsifiers, such as, in particular, the ammonium or alkali metal salts of perfluorooctanoic acid.

Useful fluorine-containing monomers for copolymerization with $VF_2$ or VF include hexafluoropropylene ("HFP"), tetrafluoroethylene ("TFE"), chlorotrifluoroethylene ("CTFE"), 2-chloropentafluoro-propene, perfluoroalkyl vinyl ethers, for example, $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Squire). Certain fluorine-containing di-olefins also are useful, such as perfluorodiallylether and perfluoro-1,3-butadiene. Said fluorine-containing monomer or monomers also may be copolymerized with fluorine-free terminally unsaturated olefinic co-monomers, for example, ethylene or propylene. Preferably, at least 50 percent by weight of all monomers in a polymerizable mixture are fluorine-containing monomers. The fluorine-containing monomer(s) may also be copolymerized with iodine-or bromine-containing cure-site monomers in order to prepare peroxide curable polymers. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-butene-1.

Commercially available fluoropolymer materials of this first class include, for example, THV 200 fluoropolymer (available from Dyneon LLC, Saint Paul, Minn.), THV 500 fluoropolymer (available from Dyneon LLC), KYNAR™ 740 fluoropolymer (available from Elf Atochem North America, Inc., Glen Rock, N.J.), and fluoroelastomers such as FLUOREL™ FC-2178 fluoropolymer (available from Dyneon LLC) that have been crosslinked with, for example $BF_6$ or protected polyhydroxy-aromatic compounds are also suitable for use in the preparation of the laminate constructions of the present invention.

The second class of fluorinated materials useful in the practice of the invention broadly comprises those fluorinated polymers, copolymers, terpolymers, etc., comprising interpolymerized units derived from one or more of hexafluoropropylene ("HFP") monomers, tetrafluoroethylene ("TFE") monomers, chlorotrifluoroethylene monomers, and/or other perhalogenated monomers, and further derived from one or more hydrogen-containing and/or non-fluorinated olefinically unsaturated monomers. Useful olefinically unsaturated monomers include alkylene monomers such as ethylene, propylene, 1-hydropentafluoropropene, 2-hydropentafluoropropene, etc.

Fluoropolymers of this second class can be prepared by methods known in the fluoropolymer art. Such methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See, for example, U.S. Pat. No. 4,335,238 (Moore et al.).

Representative of the fluoropolymer materials of the second class are poly(ethylene-co-tetrafluoroethylene) (ETFE), poly(tetrafluoroethylene-co-propylene), poly (chlorotrifluoroethylene-co-ethylene) (ECTFE), and the terpolymer poly(ethylene-co-tetrafluoroethylene-co-hexafluoropropylene), among others; all of which may be prepared by the above-described known polymerization methods. Many useful fluoropolymer materials also are available commercially, for example, from Dyneon LLC, under the trade designations HOSTAFLON™ X6810 and X6820; from Daikin America, Inc., Decatur, Ala., under the trade designations NEOFLON™ EP-541, EP-521, and EP-610; from Asahi Glass Co., Charlotte, N.C., under the trade designations AFLON™ COP C55A, C55AX, C88A; and from E.I. Du Pont de Nemours and Company, under the trade designations TEFZEL™ 230 and 290.

The third class of fluorinated materials useful in the practice of the invention broadly comprises blends of fluoropolymers and polyolefins. Specific examples include blends of PVDF and poly(methyl methacrylate) (PMMA) and blends of PVDF and high vinyl acetate functionalized polyolefins.

The compositions of the invention may additionally include one or more organo-onium salt catalysts. An organo-onium is the conjugate acid of a Lewis base (e.g., phosphine, amine and ether) that can be formed by reacting the Lewis base with a suitable alkylating agent (e.g., an alkyl halide or acyl halide). As a result of the reaction, there is an expansion of the valence of the electron donating atom of the Lewis base and a positive charge on the organo-onium compound. Many of the organo-onium compounds useful in the present invention contain at least one hetero atom (i.e. a non-carbon atom such as N, P, and O bonded to the organic or inorganic moieties). One class of quaternary organo-onium compounds particularly useful in the present invention broadly comprises relatively positive and relatively negative ions wherein a phosphorous, arsenic, antimony, or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.). Because of their relative stability in the presence of most inorganic bases, phosphoniums are the most preferred organo-oniums for use in the present invention. Sulfoniums are not chemically stable in the presence of most organic and inorganic bases and therefor are not considered useful in the invention.

Many of the useful organo-onium compounds are known and described in the literature. See, for example, U.S. Pat. Nos. 4,233,421 (Worm), 4,912,171 (Grootaert et al.), 5,086, 123 (Guenther et al.), and 5,262, 490 (Kolb et al.), all of which are incorporated herein by reference. Fluorinated oniums, such as those described in U.S. Pat. No. 5,591,804 (Coggio et al.), and multifunctional oniums, such as those comprising two or more onium groups in the same molecule, (e.g., bis-phosphoniums) may also be employed. Representative examples include, but are not limited to the following individually listed compounds and mixtures thereof:

triphenylbenzyl phosphonium chloride
tributylallyl phosphonium chloride
tributylbenzyl ammonium chloride
tetrabutyl ammonium bromide
tetrabutyl phosphonium bromide
8-benzyl-1,8-diazabicyclo[5,4,0]-7-unecenium chloride
benzyl tris(dimethylamino) phosphonium chloride
benzyl(diethylamino) phosphonium chloride
benzyl(diethylamino)diphenylphosphonium chloride The addition of an onium catalyst to the composition may in some instances aid or increase the adhesion of the tie layer composition to a fluoropolymer and/or to another substrate.

The bonding compositions of the present invention may be made by compounding the components of the composition in a mixing vessel using sufficient heat to melt the substantially non-fluorinated polymer and accompanying mixing to produce a uniform mixture. For ease of manufacture, the compounding operation may be carried out in an extruder.

The laminated structures of the present invention may be made by a coextrusion process wherein the various layers of the laminate construction are brought together with heat and pressure that may result in adequate adhesion between the various components of the laminate. However, in the event that the resulting adhesion is too low, it may be desirable to further treat the resulting multi-layer composition, for example, with additional heat and/or pressure to increase interlayer adhesion. Extended heat exposure can be realized simply by delaying the cooling of the composition as it exits the coextrusion process. If additional heating is required, it may also be accomplished by coextruding the laminate at a temperature higher than necessary for normal processing the components. Alternatively, the finished article may be held at an elevated temperature for an extended period of time, or the finished article may be placed in a separate means for elevating the temperature of the article, such as an oven or heated liquid bath. Yet another method of applying additional heat and pressure to the laminate is to pass it through one or more heated calendar rolls that is/are maintained at sufficient temperature and pressure to achieve the desired interlayer bond strength. A combination of these methods may also be used.

The laminated structures of the present invention may also be prepared by laminating a film of the bonding composition to a fluoropolymer material by the application of heat and pressure and subsequently laminating a substantially non-fluoropolymer material to the bonding composition in a second step by the application of heat and pressure. Alternatively, the laminated structures can be prepared in a single operation by assembling a stack of films comprising, in order, a fluoropolymer film, a bonding composition film, and a substantially non-fluoropolymer film and forming a consolidated laminate from the film stack be application of heat and pressure.

Yet a third way of forming the laminated structures of the present invention is to apply the bonding composition to the fluoropolymer material as a solution coating, allowing the solvent to evaporate, and subsequently forming a laminate construction by applying the substantially non-fluorinated polymeric material to the bonding composition coated portion of the fluoropolymer surface by applying sufficient heat and pressure to the laminate to produce a consolidated laminate.

The methods of this invention provide multi-layer compositions with improved inter-layer adhesion. The methods and compositions of this invention are particularly useful for making articles, such as tubing and hoses, suitable for use in motor vehicles, for example as fuel-line hoses, and for films and blow-molded articles such as bottles and anti-graffiti films where chemical resistance or barrier properties are important. The two-layer compositions of this invention are also useful in preparing compositions having three or more layers. For example, a three layer composition of fluoropolymer to anhydride modified polyolefin to unmodified polyolefin could be prepared and might be useful in a fuel-tank construction.

Transparent embodiments of multi-layer compositions of the present invention may find particular utility in the construction of retroreflective sheeting articles generally, and particularly when resistance to chemical agents, solvents, soils, reduced moisture vapor transmission, or good interlayer adhesion in flexible sheetings subject to severe bending and flexing is required.

The compositions of this invention may be rendered retroreflective by forming retroreflective elements on one side of the composition, or alternatively, by attaching a retroreflective base sheet by means of a transparent adhesive or by direct lamination. The retroreflective base sheet may comprise a member with cube corner retroreflective elements or may comprise a microsphere-based retroreflective structure, e.g., comprising a monolayer of transparent microspheres and reflective means disposed on the opposite side of the monolayer from the multi-layer composition. It is preferred that the base layer is disposed on the non-fluoropolymer layer of the multi-layer composition. An embodiment of this invention includes the encapsulated retroreflective sheeting article as is disclosed in U.S. Pat. No. 3,190,178 (McKenzie), in which the cover layer is provided by a multi-layer composition according to the present invention.

Retroreflective articles of the invention may be made in rigid or flexible form. Multi-layer compositions of the present invention may be used as barrier layers. An embodiment of the present invention includes articles in accordance with U.S. Pat. No. 5,069,964 (Tolliver) which is incorporated herein by reference, in which the plasticizer resistant barrier layer comprises a multi-layer composition in accordance with the present invention. The multi-layer compositions of the present invention may find particular utility in the construction of flexible retroreflective sheeting articles. A preferred embodiment of the present invention includes a retroreflective article in accordance with PCT Publication Nos. WO 95/11464 or WO 95/11943, both of which are incorporated herein by reference, wherein the flexible overlay film described in PCT Publication No. WO 95/11464 or the flexible body layer of PCT Publication No. WO 95/11943 is constituted by a multi-layer composition in accordance with this invention.

EXAMPLES

Glossary

EVAL 105, is a trade name for an ethylene vinyl alcohol copolymer, available from Eval Company of Am., Lisle, Ill.

ELVAX 250, ELVAX 450, are trade names for ethylene/vinyl acetate copolymers, commercially available from E.I. DuPont de Nemours and Co., Wilmington Del.

PRIMACOR 3150 is a trade name for an ethylene/acrylic acid copolymer, commercially available from Dow Chemical Company, Midland, Mich.

EMAC 2220 is a trade name for a ethylene/methyl acrylate copolymer, commercially available from Chevron Chemical Co., Houston, Tex.

BYNELL 3101 is a trade name for a ethylene/vinyl acetate copolymer and having an organic acid group grafted thereon, commercially available from E.I. DuPont de Nemours.

AT1841 is an ethylene/vinyl acetate copolymer, commercially available from AT Polymer, Edmonton, Canada.

PU is a polyurethane polymer, commercially available under the designation MORTHANET™ L424.167 (MI=9.8) from Morton International, Inc., Seabrook, N.H.

THV200 is a terpolymer of tetrafluoroethylene, hexafluoropropylene, and vinylidene fluoride, commercially available from Dyneon LLC, St. Paul, Minn.

THV500 is a terpolymer of tetrafluoroethylene, hexafluoropropylene, and vinylidene fluoride, commercially available from Dyneon LLC.

18-crown-6 is a crown ether available from Aldrich Chemical, Milwaukee, Wis.

LLDPE is a linear, low density polyethylene film, available from Dow Chemical Company, Midland, Mich.

Bu$_4$PBr is tetrabutyl phosphonium bromide.

NaOSi(CH$_3$)$_3$ is sodium trimethylsilanoate.

KP is potassium phthalimide.

KOH is potassium hydroxide.

LiOH is lithium hydroxide.

NaOH is sodium hydroxide.

KOCH$_3$ is potassium methoxide.

NaOPh is sodium phenoxide.

Tyramine hydrochloride, 4-(2-aminoethyl)-phenol, available from Aldrich Chemical.

Examples 1–27

The bonding composition, as described in Table 1 below, was prepared by compounding the substantially non-fluorinated polymer, a base, and a crown ether in an internal bowl mixer equipped with roller blades that was operated at 200° C. and a mixing speed of 60–70 rpm for a period of ten minutes. The compounded bonding composition was subsequently formed into a flat film 0.2 cm thick in a heated press operating at 200° C. and 24 KPa (3.5 psi) pressure for a period of approximately 30 seconds. Composites were prepared by assembling a laminate structure consisting of a fluoropolymer film, 2.54 cm by 7.62 cm (1 inch by 3 inches) in size and 0.2 cm thick, of THV200 and THV500, the bonding composition film 1.25 cm by 5.08 cm in size (0.5 inch by 2 inches), and an LLDPE film (2.54 cm by 7.62 cm (1 inch by 3 inches) in size and 0.32 cm thick). A strip of silicone liner (#7520, available from Minnesota Mining and Manufacturing Company, St. Paul, Minn.) 2.54 cm by 7.62 cm (1 inch by 3 inches) was inserted between the THV layer and the substantially non-fluoropolymer layer to a depth of 1.25 cm (0.5 inch) along the short edge of laminate construction prior to placing the laminate in a press to produce a composite. Three identical composites were simultaneously prepared in a "hot press" using a Wabash Hydraulic Press Co. heated platen press operating at 200° C. at a pressure of 24 KPa (3.5 psi) for two minutes. The composites were removed from the press, cooled to room temperature in a "cold press," and the silicone liner removed to provide samples of the consolidated laminates having THV and the substantially non-fluoropolymer layer "tabs" suitable for T-Peel testing.

The adhesion between the fluoropolymer and substantially non-fluoropolymer layers was tested according to the procedures outlined in ASTM D-1876, commonly known as a "T-peel" test. The "T-peel" strength of the bonds of the laminate was determined using an Instron™ Model 1125 tester, commercially available from Instron Corp., Plano, Tex., operating at a crosshead speed of 100 mm/min. Peel strength, calculated as the average load measured during the peel test, is reported in Table 1 below.

Comparative Examples 1 and 2 were prepared and tested substantially as described in the above procedure for Examples 1–27 except that the crown ether was omitted from the bonding composition formulation.

TABLE 1

"T-Peel" Strength Data

| Example | Bonding Composition | THV200 Substrate Kg/2.54 cm (LbF/in) | THV500 Substrate NKg/2.54 cm (LbF/in) | PVDF Substrate Kg/2.54 cm (LbF/in) | LDPE Substrate Kg/2.54 cm (LbF/in) |
|---|---|---|---|---|---|
| 1 | ELVAX-450/KOH/ 18-crown-6.20/0.2/0.2 | 2.5 (5.4) | 6.1 (13.5) | — | 5.5 (11.0) |
| 2 | ELVAX-450/KOH/ 18-crown-6.20/0.2/0.1 | 0.7 (1.5) | 3.8 (8.3) | — | — |
| 3 | ELVAX-450/KOH/ 18-crown-6/BU$_4$PBr 20/0.2/0.1/0.1 | 5.1 (11.2) | 6.5 (14.2) | — | — |
| 4 | ELVAX-450/K0H/ 18-crown-6/BU$_4$PBr 20/0.1/0.1/0.1 | 0 (0) | 4.9 (10.7) | — | — |
| 5 | PRIMACOR-3150/KOH/ 18-crown-6 20/0.2/0.2 | 1.9 (4.2) | 0 (0) | — | — |
| 6 | PRIMACOR-3150/KOH/ 18-crown-6 20/0.4/0.2 | 4.5 (10.0) | 0.9 (2.0) | — | — |
| 7 | PRIMACOR-3150/KOH/ 18-crown-6/BU$_4$PBr 20/0.2/0.1/0.1 | 4.5 (10.0) | 0.9 (2.0) | — | 5.0 (11) |
| 8 | PRIMACOR-3150/K0H/ 18-crown-6/BU$_4$PBr 20/0.4/0.1/0.1 | 7.9 (17.5) | 2.3 (5.2) | — | 5.9 (13) |
| 9 | EMAC-2220T/KOH/ 18-crown-6 20/0.2/0.2 | (Low) | 2.7 (6.0) | — | — |
| 10 | EMAC-2220T/KOH/ 18-crown-6 20/1.0/0.2 | 6.8 (15.0) | >5.4 (>11.8) | — | — |
| 11 | BYNELL-3101/KOH/ 18-crown-6/BU$_4$PBr 20/0.2/0.1/0.1 | 1.4 (3.0) | 3.6 (8.0) | — | 5.5 (12) |
| 12 | PRIMACOR-3150/KP/ 18-crown-6 20/0.4/0.2 | 3.4 (7.5) | 0 (0) | — | — |
| 13 | BYNELL-3101/KP/ 18-crown-6 20/0.6/0.2 | (Low) | 1.9 (4.1) | — | — |

TABLE 1-continued

"T-Peel" Strength Data

| Example | Bonding Composition | THV200 Substrate Kg/2.54 cm (LbF/in) | THV500 Substrate NKg/2.54 cm (LbF/in) | PVDF Substrate Kg/2.54 cm (LbF/in) | LDPE Substrate Kg/2.54 cm (LbF/in) |
|---|---|---|---|---|---|
| 14 | BYNELL-3101/NaOSi(CH$_3$)$_3$/18-crown-6/BU$_4$PBr 20/0.6/0.1/0.1 | — | 2.4 (5.2) | 0.6 (1.2) | — |
| 15 | EMAC-1305/NaOPh/18-crown-6 20/1.0/0.2 | 1.8 (4.0) | 2.0 (4.3) | — | — |
| 16 | EMAC-1305/KOCH$_3$/18-crown-6 20/1.0/0.2 | 4.8 (10.5) | 4.4 (9.7) | — | — |
| 17 | EMAC-1305/NaOPh/18-crown-6/BU$_4$PBr 20/1.0/0.1/0.1 | 6.1 (13.4) | 7.4 (16.2) | — | — |
| 18 | EMAC-1305/KP/18-crown-6/BU$_4$PBr 20/0.6/0.1/0.1 | 0 (0) | 4.1 (8.9) | — | — |
| 19 | PU/NaOSi(CH$_3$)$_3$/18-crown-6 20/0.2/0.2 | >5.0 (>10.9) | 2.7 (5.9) | — | — |
| 20 | PU/NaOSi(CH$_3$)$_3$/18-crown-6/BU$_4$PBr 20/0.2/0.1/0.1 | 6.5 (14.4) | 8.0 (17.7) | — | — |
| 21 | AT1841/NaOH/15-crown-5 20/0.2/0.2 | 0.3 (0.6) | <0.2 (<0.5) | — | — |
| 22 | AT1841/KOH/15-crown-5 20/0.2/0.2 | 3.6 (8.0) | 0.9 (2.0) | — | — |
| 23 | AT1841/LiOH/15-crown-5 20/0.2/0.2 | 0 (0) | — | — | — |
| 24 | Nylon-12/KOH/18-crown-6 20/0.2/0.2 | 7.5 (16.5) | 1.4 (3.0) | — | — |
| 25 | EVA/E105/BF$_6$Di K$^+$ Salt[1]/18-crown-6 | 16.1 (35.6) | <0.5 (<1) | — | — |
| 26 | Primacor 3650/KOH/18-crown-6 | 4.6 (10) | 0.9 (1.97) | — | — |
| 27 | EVA/E105/Tyramine salt/18-crown-6 | 18.4 (40.4) | 1.0 (2.1) | — | — |
| Comparative Example 1 | Nylon-12/KOH 20/0.2 | 4.5 (9.9) | 0 (0) | — | — |
| Comparative Example 2 | EVA/E105/Tyramine salt | 1.4 (3.1) | — | — | — |

[1]The BF$_6$ dipotassium salt was prepared by mixing one equivalent of Bisphenol-AF with two equivalents of methanolic potassium methoxide and removing the methanol by evaporation to obtain a solid salt.

What is claimed is:

1. A bonding composition comprising a mixture of:
    a) a melt-processable, substantially non-fluorinated thermoplastic polymer selected from the group consisting of functionalized polyolefins, polyamides, polyurethanes, and mixtures thereof; and
    b) a catalyst system comprising a base and from 0.5 to 1 weight percent crown ether based on the total weight of the composition mixed within said melt-processable, substantially non-fluorinated polymer.

2. The composition of claim 1 wherein the base is a metal hydroxide, a metal aryloxide, a metal alkoxide, an organic base, or a mixture thereof.

3. The composition of claim 2 wherein the metal hydroxide base is selected from the group consisting or lithium hydroxide, potassium hydroxide, sodium hydroxide, and mixtures thereof.

4. The composition of claim 2 wherein the metal alkoxide base is selected from the group consisting of potassium methoxide, potassium ethoxide, sodium methoxide, sodium ethoxide, potassium phenoxide, sodium phenoxide, and mixtures thereof.

5. The composition of claim 2 wherein the organic base is selected from the group consisting of potassium phthalimide and sodium trimethylsilanoate.

6. The composition of claim 1 wherein the crown ether is an 18-crown-6 ether or a 15-crown-5 ether.

7. The composition of claim 1 wherein the functionalized polyolefin comprises one or more functional groups selected from the group consisting of imide, amide, oxycarbonyl, anhydride, acetate, carbonyl, and hydroxide groups.

8. The composition of claim 7 wherein the functional group is pendant from the polymer backbone.

9. The composition of claim 1 further comprising an organo-onium.

10. The composition of claim 1 wherein
    the base is selected from the group consisting of lithium hydroxide, potassium hydroxide, sodium hydroxide, potassium methoxide, potassium ethoxide, sodium methoxide, sodium ethoxide, potassium phenoxide, sodium phenoxide, potassium phthalimide, sodium trimethylsilanoate, and mixtures thereof; and
    the crown ether is an 18-crown-6 ether.

* * * * *

UNITED STATES PATENT AND TRADEMARK OFFICE
CERTIFICATE OF CORRECTION

PATENT NO.        : 6,767,948 B1
APPLICATION NO.   : 09/470155
DATED             : July 27, 2004
INVENTOR(S)       : Naiyong Jing It is certified that error appears in the above-identified patent and that said Letters Patent is hereby corrected as shown below:

Column 3,
Line 51, delete "6,T" and insert in place thereof -- 6,I --.
Line 65, delete "polytetrarmethylene" and insert in place thereof
-- polytetramethylene --.

Column 8,
Line 57, delete "MORTHANET™" and insert in place thereof
-- MORTHANE™ --.

Column 10,
TABLE 1, Example 1, Line 2, delete "6.20" and insert in place
thereof -- 6 20 --.
TABLE 1, Example 2, Line 2, delete "6.20" and insert in place
thereof -- 6 20 --.

Column 11,
Line 57, delete "or lithium" and insert in place thereof -- of lithium --.

Signed and Sealed this

Twenty-sixth Day of December, 2006

JON W. DUDAS
*Director of the United States Patent and Trademark Office*